(12) United States Patent
Murphy

(10) Patent No.: US 7,484,921 B2
(45) Date of Patent: Feb. 3, 2009

(54) LIFT GATE SYSTEM

(76) Inventor: Michael O. Murphy, 6005 Barrows, Kountze, TX (US) 77625

( * ) Notice: Subject to any disclaimer, the term of this patent is extended or adjusted under 35 U.S.C. 154(b) by 478 days.

(21) Appl. No.: 11/210,580

(22) Filed: Aug. 24, 2005

(65) Prior Publication Data

US 2007/0065262 A1   Mar. 22, 2007

(51) Int. Cl.
   *B60P 9/00* (2006.01)
(52) U.S. Cl. ........................ 414/462; 414/550
(58) Field of Classification Search ................. 414/462, 414/557, 556
   See application file for complete search history.

(56) References Cited

U.S. PATENT DOCUMENTS

| | | | | |
|---|---|---|---|---|
| 3,185,322 A | * | 5/1965 | Matthews | 414/545 |
| 4,993,908 A | * | 2/1991 | Park | 414/472 |
| 5,211,526 A | * | 5/1993 | Robinette | 414/550 |
| 5,234,310 A | | 8/1993 | Driver | |
| 5,284,414 A | | 2/1994 | Kempf | |
| 5,674,046 A | * | 10/1997 | Meyer | 414/686 |
| 5,857,741 A | * | 1/1999 | Anderson | 297/170 |
| 5,960,662 A | * | 10/1999 | Morello | 72/166 |
| 6,164,895 A | * | 12/2000 | Croswell | 414/462 |
| 6,478,528 B1 | * | 11/2002 | Asbury | 414/550 |
| 6,821,075 B2 | * | 11/2004 | van der Horn | 414/462 |
| 6,893,203 B2 | | 5/2005 | Anderson et al. | |
| 2004/0105745 A1 | * | 6/2004 | Sandy | 414/557 |

\* cited by examiner

*Primary Examiner*—Charles A Fox
(74) *Attorney, Agent, or Firm*—John R Casperson

(57) ABSTRACT

A modular lift gate system which can be easily moved from one vehicle to another comprises a brace frame assembly, a mount, a gate carrier frame, and a gate assembly. The brace frame carries a pair of downwardly extendable legs. The mount is for mounting the brace frame assembly to a vehicle having a receiver hitch, the mount being received by the brace frame assembly. The gate carrier frame is mounted for vertical movement on the brace frame assembly. The gate assembly is mounted for vertical movement on the gate carrier frame.

18 Claims, 8 Drawing Sheets

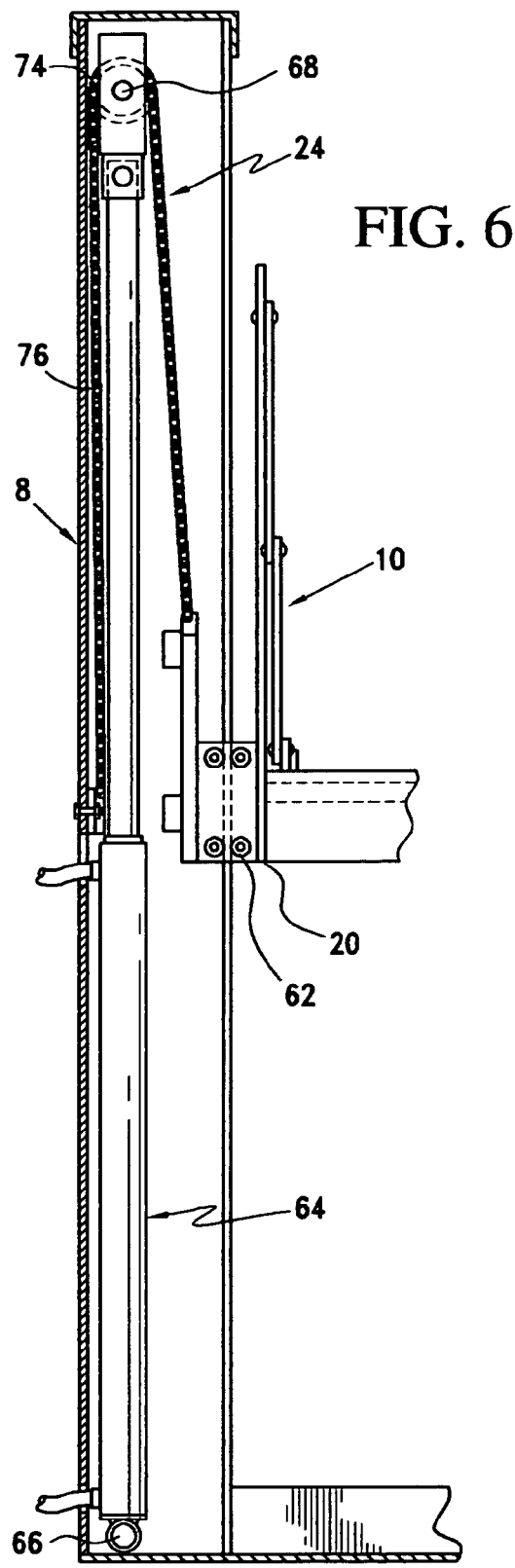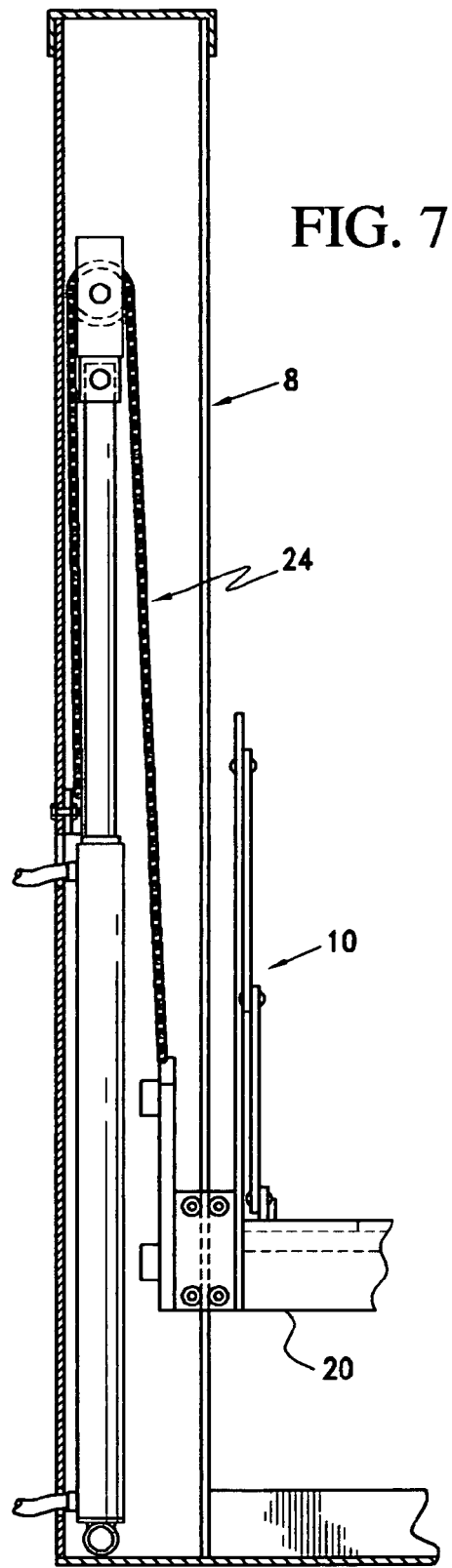

LIFT GATE SYSTEM

BACKGROUND OF THE INVENTION

The invention relates generally to a lift gate system for a motor vehicle and is especially well adapted for deployment on pickup trucks.

Prior art lift gates were complex devices that required modification to the vehicle frame and electrical system. Because of this, it was generally not practical to move such lift gates from one vehicle to another. An easily movable lift gate system would be desirable.

Also, prior art lift gates generally relied solely upon the vehicle for support. This placed a fairly low practical limit on their lift capacity. A more robust lift gate design is needed.

Further, prior art lift gates generally could not function with a vehicle tail gate in place. Recent studies suggest that removal of the tail gate harms fuel efficiency. A lift gate that permits the vehicle tail gate to remain in position would be more economical to use.

It is an object of the invention to provide a vehicle lift gate system which overcomes the above noted deficiencies of the prior art systems.

SUMMARY OF THE INVENTION

In accordance with one embodiment of the invention, there is provided a lift gate system which comprises a brace frame assembly, a mount, a gate carrier frame, and a gate assembly. The brace frame carries a pair of downwardly extendable legs. The mount is for mounting the brace frame assembly to a vehicle having a receiver hitch, the mount being received by the brace frame assembly. The gate carrier frame is mounted for vertical movement on the brace frame assembly. The gate assembly is mounted for vertical movement on the gate carrier frame.

BRIEF DESCRIPTION OF THE DRAWINGS

FIG. 6 is a view of the lift gate system, as would appear from the back of the vehicle, taken in partial cross section to show internal details and showing the elements in the same configuration as in FIG. 3.

FIG. 7 is a view as in FIG. 6 but showing the elements in the same configuration as in FIG. 5.

DETAILED DESCRIPTION OF THE INVENTION

Figure 1:
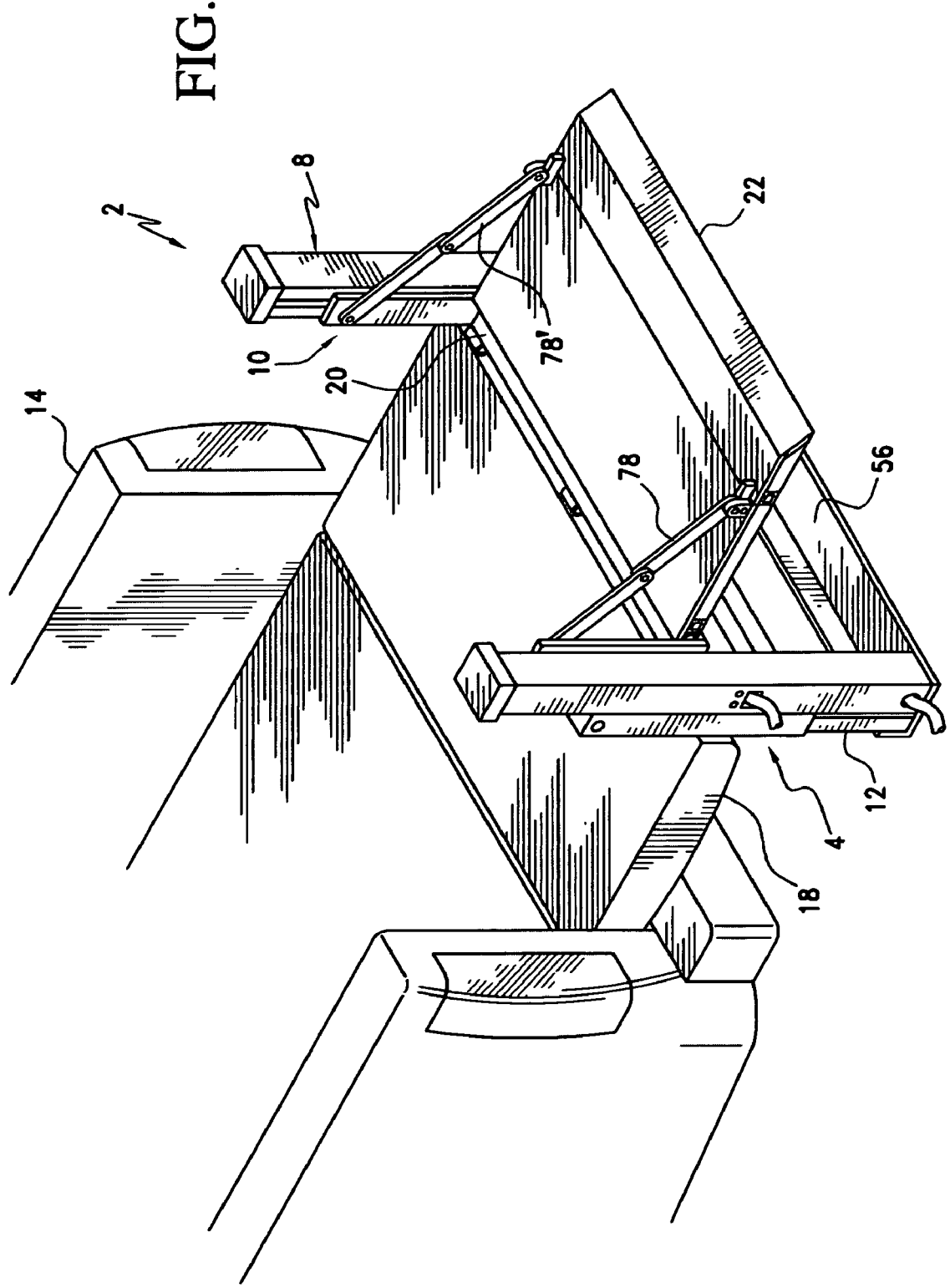
FIG. 1 is a perspective illustration of a lift gate system according to one embodiment of the invention mounted on a vehicle and in a longitudinally extended, braced against the ground, gate-unfolded and raised configuration.

In accordance with one embodiment of the invention, there is provided a lift gate system 2 which comprises a brace frame assembly 4, a mount 6, a gate carrier frame 8, and a gate assembly 10. The brace frame carries a pair of downwardly extendable legs 12, 12'. The mount is for mounting the brace frame assembly to a vehicle 14 having a receiver hitch 16, the mount being received by the brace frame assembly. The gate carrier frame is mounted for vertical movement on the brace frame assembly. The gate assembly is mounted for vertical movement on the gate carrier frame.

Figure 9:
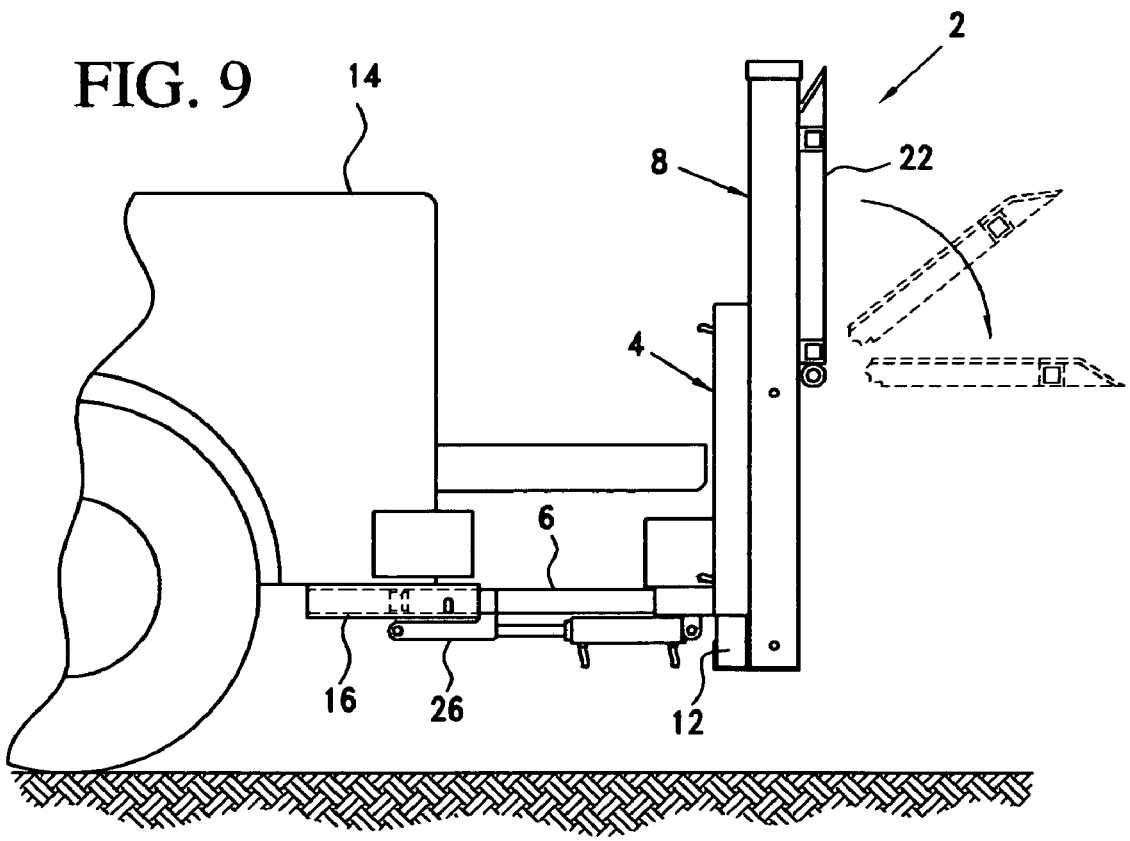
FIG. 9 is a pictorial illustration from the side of the vehicle showing the gate system in a fully longitudinally extended, raised from the ground, gate raised unfolding process configuration.
Figure 10:
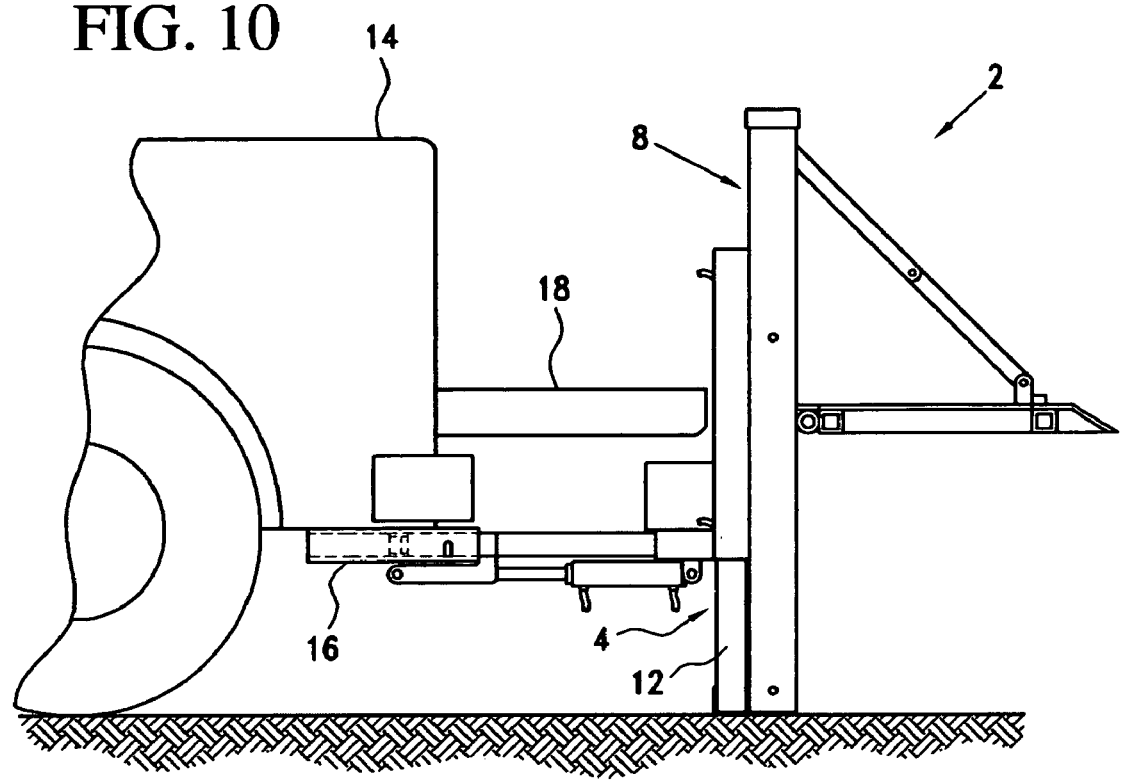
FIG. 10 is a pictorial illustration from the side of the vehicle showing the gate system in a fully longitudinally extended, braced against the ground, gate unfolded and in raised configuration.

The pair of downwardly extendable legs are linearly movable vertically from a retracted position, for example, as shown in FIG. 9, to an extended position, for example, as shown in FIG. 10. In the extended position, the legs are braced against the ground, thus providing support to the lift gate system in addition to that provided by the receiver hitch. This can be accomplished by providing slidable legs which are manually slid into position and locked, such as by pins or clamps, or screwed into position, either manually or via an electric motor, or hydraulically urged into position.

Figure 8:
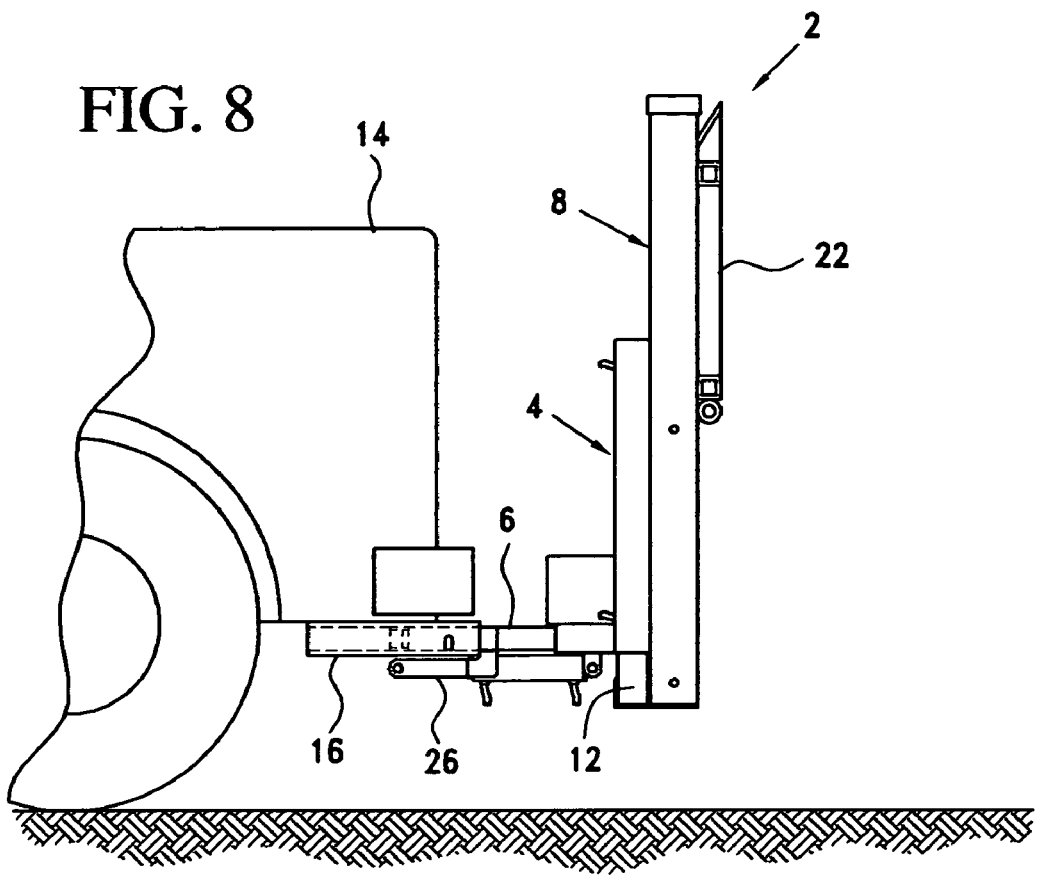
FIG. 8 is a pictorial illustration from the side of the vehicle showing the gate system in a partially longitudinally extended, raised from the ground, gate raised and folded configuration.

Preferably, the brace frame assembly is linearly movable horizontally on the mount from a retracted position, as shown in FIG. 8, to an extended position, for example, as shown in FIG. 9, because this capacity permits the invention to be used with a vehicle having a tailgate 18. However, this functionality would not be necessary where the vehicle does not have a tailgate. This function, can be provided by slidably mounting the brace frame assembly on the mount so that it can be manually slid into position and locked, such as by pins or clamps, or urged into position under power, such as by an electric motor with a screw or chain drive, or by a hydraulic mechanism.

Figure 11:
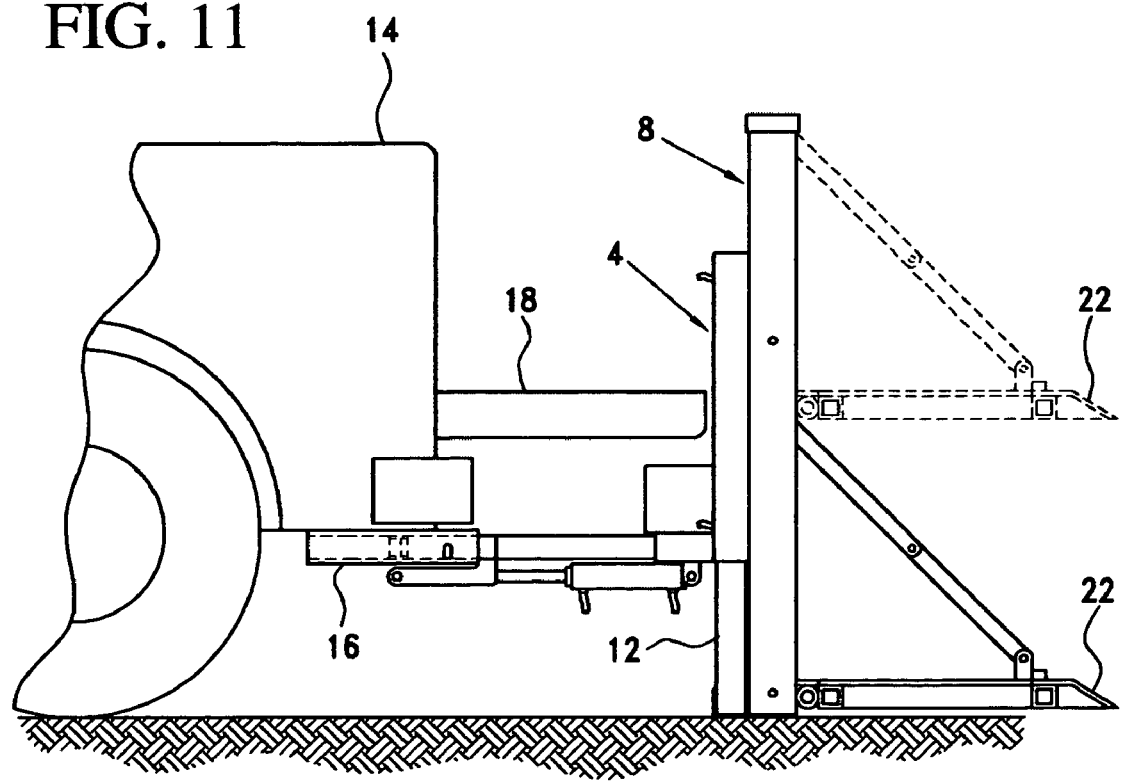
FIG. 11 is a pictorial illustration from the side of the vehicle showing the gate system in a fully longitudinally extended, braced against the ground, gate unfolded and lowered configuration.

The gate assembly is linearly movable vertically on the gate carrier frame from a lowered position, for example as shown by the solid lines in FIG. 11, to a raised position, for example as shown by the ghost lines in FIG. 11, and vice versa. This function, can be provided by slidably mounting the gate assembly on the gate carrier frame so that it can be manually slid into position and locked, such as by pins or clamps, or urged into position under power, such as by an electric motor with a screw or chain drive, or by a hydraulic mechanism.

In the illustrated embodiment of the invention, the gate carrier frame is fixedly mounted to the pair of downwardly extendable legs of the brace frame assembly so that the gate carrier frame moves vertically with the pair of downwardly extendable legs from the retracted position to the extended position, and vice versa. The gate assembly comprises a gate carrier 20 mounted for vertical movement on the gate carrier frame, and a gate 22 pivotally mounted to the gate carrier for pivotable movement from a vertical orientation to a horizontal orientation. For example, see FIG. 9.

In a preferred embodiment of the invention, an actuator means 24 is provided for moving the gate carrier from the lowered position to the raised position on the gate carrier frame. See FIGS. 6 and 7, for example. Preferably, a pair of such means would be employed, one on each side, to provide even lift.

Also in a preferred embodiment, an actuator 26 is provided for moving the brace frame assembly linearly and horizontally on the mount from the retracted position to the extended position. See FIGS. 8 and 9, for example.

Further in a preferred embodiment, an actuator means 28 is provided for moving the pair of downwardly extendable legs linearly and vertically from the retracted position to the extended position. See FIGS. 3 and 5, for example. Preferably, a pair of such means would be employed, one on each side, to provide even lift.

Figure 2:
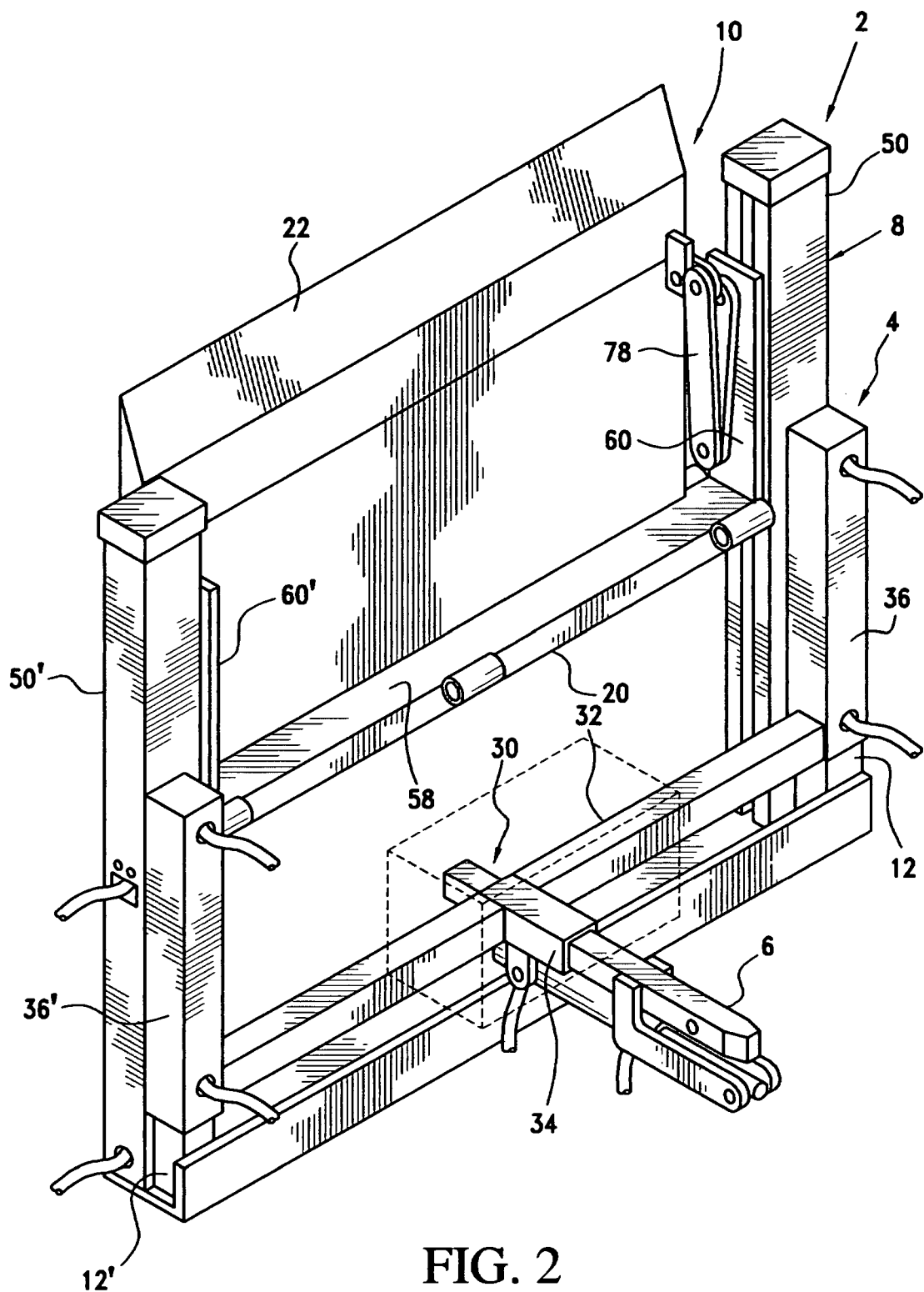
FIG. 2 is an illustration of the lift gate system of FIG. 1 taken from a different perspective, apart from the vehicle and shown in a longitudinally retracted, raised from the ground, gate-folded configuration.
Figure 5:
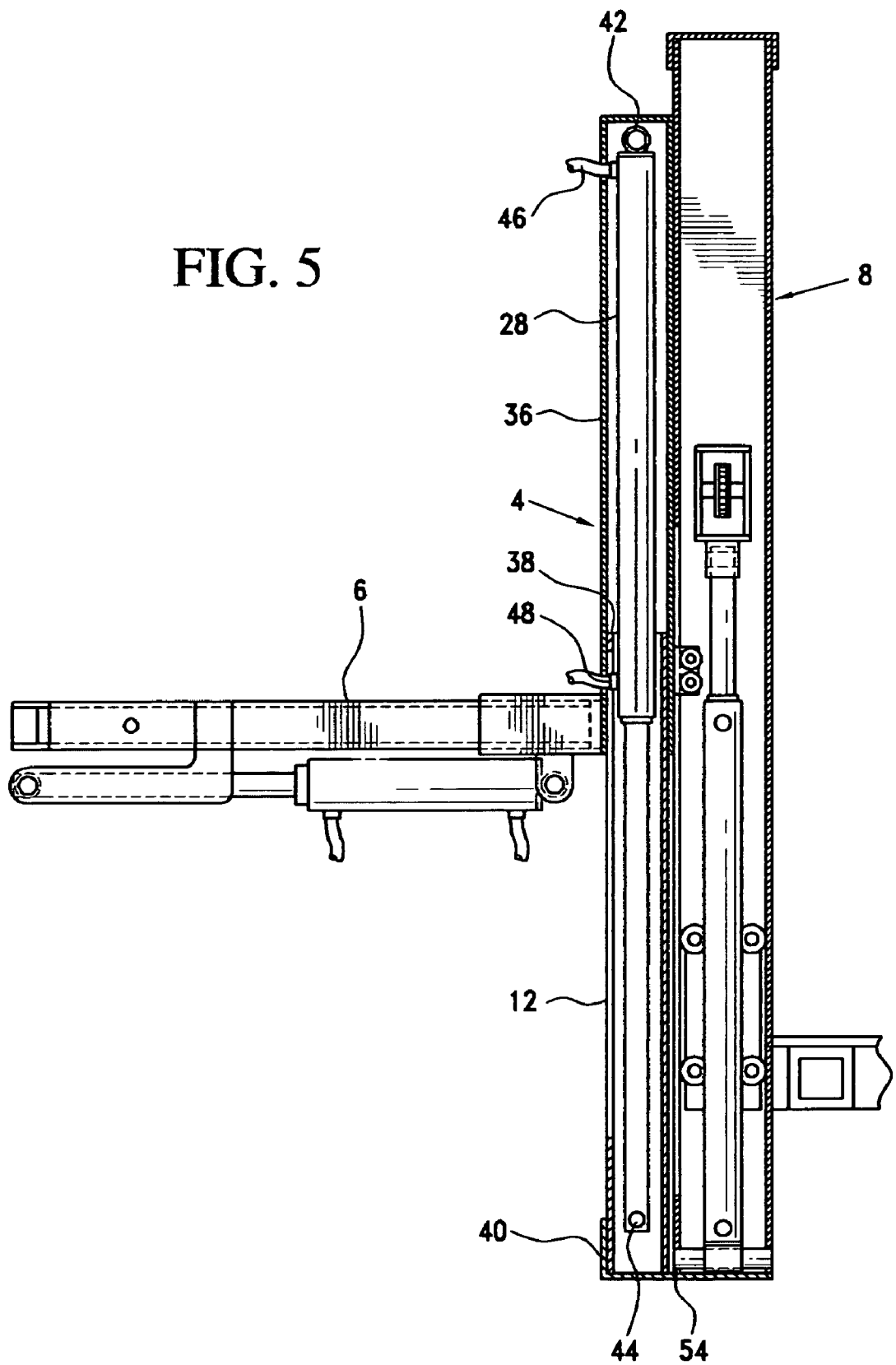
FIG. 5 is a side of the lift gate as shown in FIG. 3 taken in partial cross section to show internal details, in a longitudinally extended, braced against the ground, gate 51 unfolded and partially lowered configuration.

With reference to FIG. 2, the brace frame assembly preferably comprises a brace frame 30 comprising a horizontally-extending cross piece 32 carrying a generally centrally located receiver element 34 which receives the mount and a pair of generally vertically-extending housings 36, 36' positioned one on each end of the cross piece. The pair of downwardly extendable legs 12, 12' are positioned one in each housing. With reference to FIG. 5, each downwardly extendable leg has an upper end 38 positioned in the housing and a lower end 40 protruding from the housing and is linearly movable vertically from the retracted position to the extended position. Actuators 28 are positioned one in each of said generally vertically-extending housing for moving the legs from the retracted position to the extended position and back to the retracted position. In the illustrated embodiment, each of the actuators 28 for moving the legs comprises a hydraulic cylinder assembly having a first end 42 and a second end 44, the first end being connected to the housing and the second end being connected to the leg and ports 46, 48 to receive and exhaust hydraulic fluid.

Figure 4:
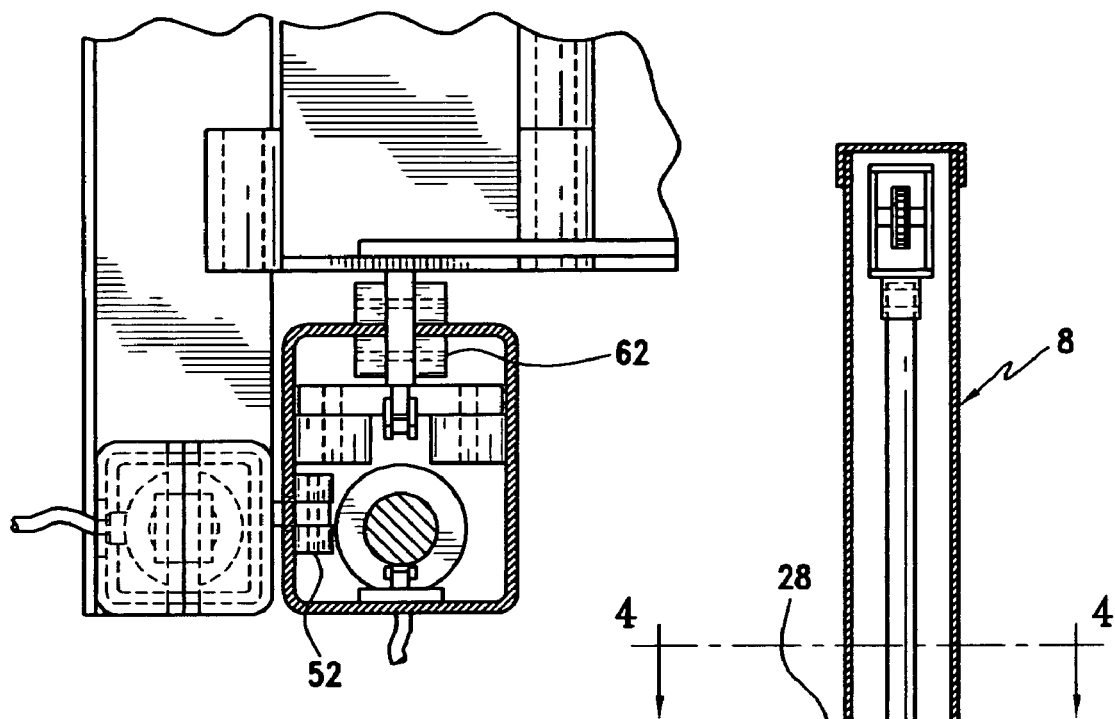
FIG. 4 is a partial cross-sectional view of a portion of the lift gate in FIG. 3 taken along lines 4-4.
Figure 3:
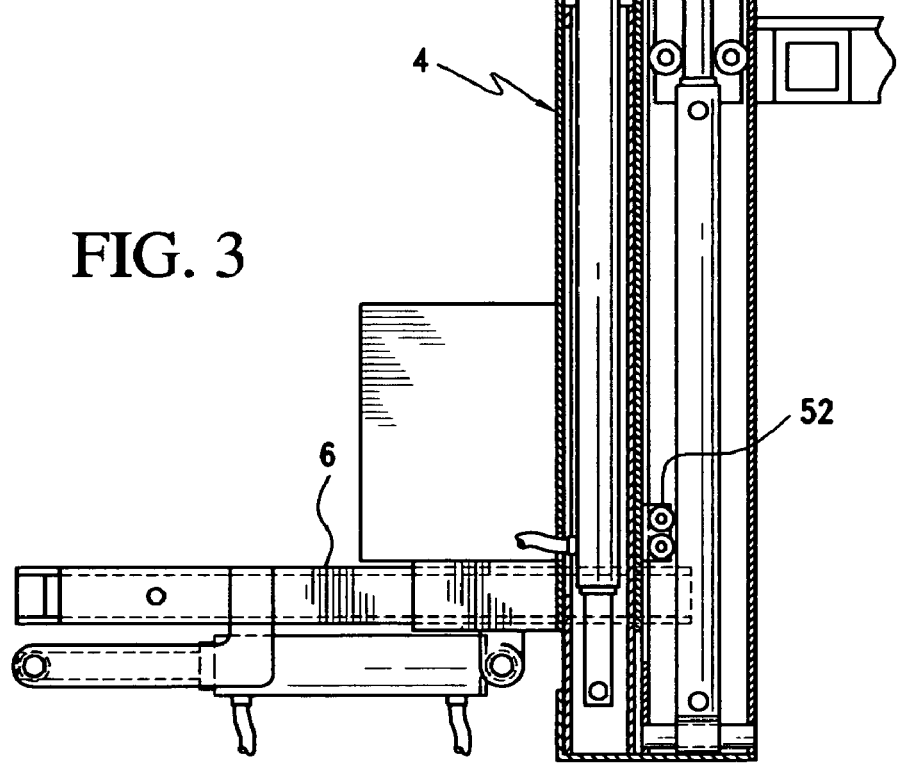
FIG. 3 is a side view of a portion of the lift gate shown in FIGS. 1 and 2, apart from the vehicle and taken in partial cross section to show internal details, in a longitudinally retracted, raised from the ground, gate-unfolded configuration.

With reference to FIG. 2, the gate carrier frame 8 comprises a pair of generally vertically positioned housings 50, 50' each having an upper end and a lower end and extending alongside one of the pair of generally vertically-extending housings 36, 36' positioned one on each end of the cross piece. With reference to FIGS. 3 and 4, for example, track assemblies 52 connect the housings of the gate carrier frame and the housings of the brace frame to permit for relative vertical movement between the housings of the gate carrier frame and the housings of the brace frame. With reference to FIG. 5, for example, a connector means 54 fixedly connects the lower ends of the legs with the lower ends of the pair of generally vertically positioned housings of the gate carrier frame so that the gate carrier frame moves up and down with the retractable legs. Fasteners or an integral welded construction, for example, can function as the connector means. In the illustrated embodiment, the connector means comprises a transversely extending base plate 56, see FIG. 1, which connects the lower ends of the legs and the lower ends of the housings of the gate carrier frame and provides a large footprint to resist sinking into the earth when the legs are extended.

With reference to FIG. 2, the gate assembly comprises the gate carrier 20 which is mounted for vertical movement on the gate carrier frame. The gate carrier comprises a transversely extending crosspiece 58 having a first end and a second end with an upwardly extending wall 60, 60' at each end. Each upwardly extending wall extends alongside one of the pair of generally vertically-extending housings of the gate carrier frame. The gate 22 is pivotally mounted to the transversely extending crosspiece of the gate carrier for pivotable movement from a vertical orientation to a horizontal orientation. With reference to FIGS. 4 and 6, track assemblies 62 connect the housings of the gate carrier frame and the ends of the transversely extending cross piece to permit relative vertical movement between the housings of the gate carrier frame and the gate carrier. The actuator means 24 for raising and lowering the gate carrier comprise a pair of actuators for the gate carrier positioned in the housings of the gate carrier frame, one actuator per housing, each connected to a respective housing and to the gate carrier.

In the embodiment illustrated in FIG. 6, each of the actuators for raising and lowering the gate carrier comprises a hydraulic cylinder assembly 64 having a first end 66 and a second end 68. The first end is connected to the housing and the second end is operable to move the gate carrier. The assembly further comprises ports to receive and exhaust hydraulic fluid. In the illustrated embodiment, the second end of the hydraulic cylinder carries a roller means 74 which acts on a flexible linkage 76 to raise and lower the gate carrier. The flexible linkage extends over the roller means and has a first end attached to the housing and a second end attached to the gate carrier. It is expected that a flexible linkage comprising a chain and a roller means comprising a sprocket which engages the chain will provide good results. The arrangement permits the stroke of the hydraulic cylinder to be doubled in its action on the gate carrier, which permits a more compact housing to be employed to house the hydraulic cylinder.

With reference to FIGS. 1 and 2, a pair of foldable linkages 78, 78' extend between the upwardly extending wall 60 or 60' at each end of the crosspiece of the gate carrier and the gate 22, one foldable linkage on each wall. The foldable linkages are fully extended when the gate is in the horizontal position as shown in FIG. 1 and foldable to permit the gate to be moved to the vertical position as shown in FIG. 2

Figure 12:
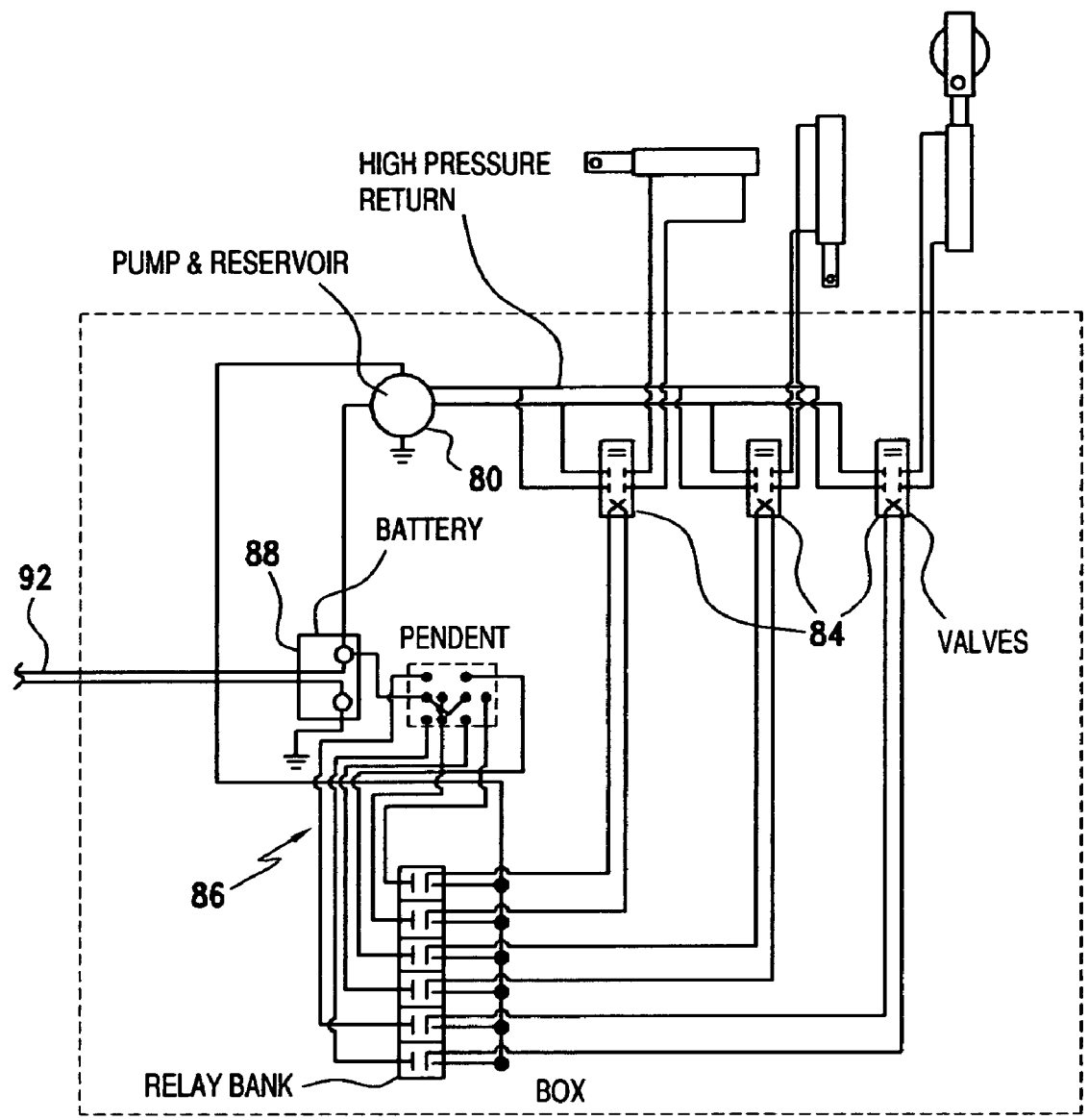
FIG. 12 schematically illustrates a control system for the lift gate system shown in FIGS. 1-11.

With reference to FIG. 12, the apparatus in the preferred embodiment further comprises a hydraulic pump 80, a plurality of hydraulic lines connecting the pump with each of the hydraulic cylinders, a plurality of valves 84 operably associated with each of the hydraulic lines to regulate the flow of hydraulic fluid therethrough, a controller 86 associated with each of the valves to permit the valves to be controlled from a remote location, and a power source 88 for the hydraulic pump and controller. The power source 88 preferably comprises a battery, such as a motorcycle battery. The apparatus preferably further comprises a housing positioned on the mount and containing the hydraulic pump, valves, and battery and a storage location for the controller. See FIG. 2, ghost lines. A power lead 92, shown schematically in FIG. 12, extends from the housing for supplying electrical power to recharge the battery from a vehicle lighting system.

ADDITIONAL DETAILS FOR PREFERRED EMBODIMENT

The preferred embodiment constitutes a completely self-contained lift gate system, including all electrical and mechanical components. The lift gate system can be installed on a vehicle having a receiver hitch without running additional wires or making vehicle alterations such as adding mounting brackets or removing the tailgate or bumper. The system can also be removed easily, such as when it is not needed, or easily moved from one vehicle to another. A great advantage of the lift gate system of the invention is that it allows the force of the load to be transferred to the ground.

The system provides unique features and advantages. First, no modifications to the vehicle are necessary to install the invention. Neither the vehicle's tailgate nor rear bumper need to be removed for installation or use of the lift gate. The lift gate can be moved from one vehicle to another in minutes or quickly and easily removed from the vehicle when not needed. Second, the lift gate lifts by apply the load directly to the ground and not to the vehicle's receiver hitch, allowing the lift gate to support more load than the receiver hitch is designed to handle. Third, the system uses a self-contained battery. There is no need to run a permanent connection to the vehicle's battery for power. The system uses a connection (pig tail) that plugs into the terminal near the vehicle's receiver hitch, where one would normally plug in the trailer lights. This connection allows the lift gate's battery to stay charged while attached to the vehicle.

To install the lift gate, simply insert the mount element into the vehicle receiver, install the pin and keeper, and connect the system to the vehicle wiring harness. The purpose of connecting the vehicle wiring harness is to keep the lift gate battery charged by using the driving lights. For operating the installed lift gate, a handheld control is preferably accessible from a container on the lift gate. A wide array of control pendant configurations could be used. One would employ a two-position rocker switch and a 4-position joy stick. Another configuration could employ a single four position joy stick by adding pressure sensors to the hydraulic lines that would make the phase 2 valve inactive until the unit is firmly pressed to the ground (phase 1). The lift gate could also be controlled by replacing the electronically controlled valves with manual valves attached to a bracket on the frame. Operation would be similar to that of a backhoe bucket. The container for storing the control and containing the additional elements shown in FIG. 12 could take the form of a box, which preferably is no longer than 52 inches and is low enough to permit the tail gate to lower over it, with one or more lids to permit the "pig tail" for connecting to the lighting circuit and the control pendant to be removed.

Once installed, the lift gate will work with or without the vehicle tailgate. For applications with a vehicle tailgate, a hand held control allows the operator to move the lift gate away from the vehicle far enough to clear the vehicle tailgate if necessary. For vehicles without a tailgate, the lift gate may not need to be moved away from the vehicle unless the operator desires to do so. Once positioned properly, the operator will lower the lifting apparatus (part of the lift gate) to contact the ground. The operator will unhook the safety pin, and manually "lower" the lift gate tailgate from its vertical, upright home position to a horizontal position and use the hand held control to position the lift gate tailgate to the desired height, either equal in height to the vehicle tailgate or bed for lowering a load, or to ground level for raising a load. When the loaded lift gate tailgate is raised, the force will be exerted through the lifting apparatus to the ground (not the vehicle). To lower a load, the operator will position the item to be lowered onto the lift gate tailgate, then select the proper switch on the hand held control and lower the load. To raise a load, the operator will position the item to be raised onto the lift gate tailgate, then select the proper switch on the hand held control and raise the load. Once the load has been raised, the operator will remove the load from the lift gate tailgate and repeat the procedure or return the lift gate tailgate to its home position. In the home position, the operator will then manually "lift" the lift gate tailgate to its vertical, upright position and attach the safety pin. Once the lift gate tailgate has been secured, the operator will raise the lifting apparatus to its home position by using the handheld control. For vehicles with a tailgate, the lifting apparatus will be moved inward to its home position. For vehicles without a tailgate, this may not be necessary.

While certain preferred embodiments of the invention have been described herein, the invention is not to be construed as being so limited, except to the extent that such limitations are described by the claims.

What is claimed is:

1. An apparatus comprising
   a brace frame assembly carrying a pair of downwardly extendable legs,
   a mount for mounting the brace frame assembly to a vehicle having a receiver hitch, said mount being received by the brace frame assembly,
   a gate carrier frame mounted for vertical movement on the brace frame assembly, and
   a gate assembly mounted for vertical movement on the gate carrier frame;
   wherein the pair of downwardly extendable legs are linearly movable vertically from a retracted position to an extended position, and
   wherein the gate carrier frame is fixedly mounted to the pair of downwardly extendable legs of the brace frame assembly so that the gate carrier frame moves vertically with the pair of downwardly extendable legs from the retracted position to the extended position.

2. An apparatus as in claim 1 wherein the brace frame assembly is linearly movable horizontally on the mount from a retracted position to an extended position, wherein the extended position positions the gate carrier frame to provide clearance for a vehicle tailgate.

3. An apparatus as in claim 1 wherein the gate assembly is linearly movable vertically on the gate carrier frame from a lowered position to a raised position.

4. An apparatus as in claim 1 wherein the gate assembly comprises
   a gate carrier mounted for vertical movement on the gate carrier frame, and
   a gate pivotally mounted to the gate carrier for pivotable movement from a vertical orientation to a horizontal orientation.

5. An apparatus as in claim 4 further comprising
   an actuator means for moving the gate carrier from the lowered position to the raised position on the gate carrier frame.

6. An apparatus comprising
   a brace frame assembly carrying a pair of downwardly extendable legs,
   a mount for mounting the brace frame assembly to a vehicle having a receiver hitch, said mount being received by the brace frame assembly,
   a gate carrier frame mounted for vertical movement on the brace frame assembly,
   a gate assembly mounted for vertical movement on the gate carrier frame,
   wherein the pair of downwardly extendable legs are linearly movable vertically from a retracted position to an extended position for bracing against the ground and the gate carrier frame is fixedly mounted to the pair of downwardly extendable legs, and
   wherein the brace frame assembly is linearly movable horizontally on the mount from a retracted position to an extended position, wherein the extended position positions the gate carrier frame to provide clearance for a vehicle tailgate, said apparatus
   further comprising an actuator for moving the brace frame assembly linearly and horizontally on the mount from the retracted position to the extended position.

7. An apparatus
   comprising a brace frame assembly carrying a pair of downwardly extendable legs,
   a mount for mounting the brace frame assembly to a vehicle having a receiver hitch, said mount being received by the brace frame assembly, a gate carrier frame mounted for vertical movement on the brace frame assembly, and a gate assembly mounted for vertical movement on the gate carrier frame, wherein the pair of downwardly extendable legs are linearly movable vertically from a retracted position to an extended position for bracing against the ground and the gate carrier frame is fixedly mounted to the pair of downwardly extendable legs, said apparatus further comprising an actuator means for moving the pair of downwardly extendable legs linearly and vertically from the retracted position to the extended position.

8. An apparatus comprising a brace frame assembly carrying a pair of downwardly extendable legs, a mount for mounting the brace frame assembly to a vehicle having a receiver hitch, said mount being received by the brace frame assembly, a gate carrier frame mounted for vertical movement on the brace frame assembly, and a gate assembly mounted for vertical movement on the gate carrier frame, wherein the brace frame assembly comprises a brace frame comprising a horizontally-extending cross piece carrying a generally centrally located receiver element which receives the mount and a pair of generally vertically-extending housings positioned one on each end of the cross piece, wherein the pair of downwardly extendable legs is positioned one in each housing, each of said pair of downwardly extendable legs having an upper end positioned in the housing and a lower end protruding from the housing and being linearly movable vertically from a retracted position to an extended position, said apparatus further comprising actuator means comprising a pair of actuators positioned one in each of said generally vertically-extending housing for moving the legs from the retracted position to the extended position and back to the retracted position.

9. An apparatus as in claim 8 wherein each of said actuators for moving the legs comprises a hydraulic cylinder assembly having a first end and a second end, the first end being connected to the housing and the second end being connected to the leg and ports to receive and exhaust hydraulic fluid.

10. An apparatus comprising a brace frame assembly carrying a pair of downwardly extendable legs, a mount for mounting the brace frame assembly to a vehicle having a receiver hitch, said mount being received by the brace frame assembly, a gate carrier frame mounted for vertical movement on the brace frame assembly, and a gate assembly mounted for vertical movement on the gate carrier frame, wherein the brace frame assembly comprises a brace frame comprising a horizontally-extending cross piece carrying a generally centrally located receiver element which receives the mount and a pair of generally vertically-extending housings positioned one on each end of the cross piece, wherein the pair of downwardly extendable legs is positioned one in each housing, each of said pair of downwardly extendable legs having an upper end positioned in the housing and a lower end protruding from the housing and being linearly movable vertically from a retracted position to an extended position, said apparatus further comprising actuator means comprising a pair of actuators positioned one in each of said generally vertically-extending housing for moving the legs from the retracted position to the extended position and back to the retracted position, wherein the gate carrier frame comprises a pair of generally vertically positioned housings each having an upper end and a lower end and extending alongside one of the pair of generally vertically-extending housings positioned one on each end of the cross piece, said apparatus further comprising a pair of track assemblies connecting the housings of the gate carrier frame and the housings of the brace frame to permit for relative vertical movement between the housings of the gate carrier frame and the housings of the brace frame, and connector means for fixedly connecting the lower ends of the legs with the lower ends of the pair of generally vertically positioned housings of the gate carrier frame so that the gate carrier frame moves up and down with the retractable legs.

11. An apparatus as in claim 10 wherein the connector means comprises a transversely extending base plate which connects the lower ends of the legs and the lower ends of the housings of the gate carrier frame and provides a large footprint to resist sinking into the earth when the legs are extended.

12. An apparatus as in claim 10 wherein the gate assembly comprises a gate carrier mounted for vertical movement on the gate carrier frame, said gate carrier comprising a transversely extending crosspiece having a first end and a second end with an upwardly extending wall at each end, each said upwardly extending wall extending alongside one of the pair of generally vertically-extending housings of the gate carrier frame, and a gate pivotally mounted to the transversely extending crosspiece of the gate carrier for pivotable movement from a vertical orientation to a horizontal orientation, said apparatus further comprising a pair of track assemblies connecting the housings of the gate carrier frame and the ends of the transversely extending cross piece to permit relative vertical movement between the housings of the gate carrier frame and the gate carrier, and an actuator means for raising and lowering the gate carrier, said actuator means comprising a pair of actuators for the gate carrier positioned in the housings of the gate carrier frame, one actuator per housing, each connected to a respective housing and to the gate carrier.

13. An apparatus as in claim 12 wherein each of said actuators for raising and lowering the gate carrier comprises a hydraulic cylinder assembly having a first end and a second end, the first end being connected to the housing and the second end being operable to move the gate carrier, and ports to receive and exhaust hydraulic fluid.

14. An apparatus as in claim 13 wherein the second end of the hydraulic cylinder carries a roller means which acts on a flexible linkage to raise and lower the gate carrier, the flexible linkage having a first end attached to the housing and a second end attached to the gate carrier, and extending over the roller.

15. An apparatus as in claim 14 wherein the flexible linkage comprises a chain and the roller means comprises a sprocket which engages the chain.

16. An apparatus as in claim 13 further comprising, in operable association
- a hydraulic pump,
- a plurality of hydraulic lines connecting the pump with each of the hydraulic cylinders,
- a plurality of valves operably associated with each of the hydraulic lines to regulate the flow of hydraulic fluid therethrough,
- a controller associated with each of the valves to permit the valves to be controlled from a remote location, and
- a power source for the hydraulic pump and controller.

17. An apparatus as in claim 16 wherein the power source comprises a battery, said apparatus further comprising a housing positioned on the mount and containing the hydraulic pump, valves, and battery and a storage location for the controller, and a power lead extending from the housing for supplying electrical power to recharge the battery from a vehicle lighting system.

18. An apparatus as in claim 12 further comprising
a pair of foldable linkages extending between the upwardly extending wall at each end of the crosspiece of the gate carrier and the gate, one foldable linkage on each wall, said foldable linkages being fully extended when the gate is in the horizontal position and foldable to permit the gate to be moved to the vertical position.

* * * * *